US006805184B1

(12) United States Patent
Hsiu-Man

(10) Patent No.: US 6,805,184 B1
(45) Date of Patent: Oct. 19, 2004

(54) STRIPPING APPARATUS FOR LABEL SEPARABLE PAPER

(76) Inventor: Yu Chen Hsiu-Man, No. 27, Sec. 1, Ta Fu Road, Tan Tzu Hsiang, Taichung (TW)

( * ) Notice: Subject to any disclaimer, the term of this patent is extended or adjusted under 35 U.S.C. 154(b) by 0 days.

(21) Appl. No.: 10/697,159

(22) Filed: Oct. 31, 2003

(51) Int. Cl.[7] .......... B32B 35/00

(52) U.S. Cl. .......... 156/584; 156/344; 221/70; 221/73; 221/131; 221/311

(58) Field of Search .......... 221/70, 71, 73, 221/92, 131, 132, 241, 242, 311; 156/344, 584

(56) References Cited

U.S. PATENT DOCUMENTS

| | | | | | |
|---|---|---|---|---|---|
| 2,754,994 | A | * | 7/1956 | Cole | 221/73 |
| 3,128,012 | A | * | 4/1964 | Berg | 221/70 |
| 3,537,933 | A | * | 11/1970 | Severance | 156/344 |
| 4,111,333 | A | * | 9/1978 | Norgaard | 221/73 |
| 4,944,827 | A | * | 7/1990 | Lilly et al. | 156/384 |
| 5,484,082 | A | * | 1/1996 | Casper et al. | 221/305 |
| 5,570,809 | A | * | 11/1996 | Martin | 221/73 |
| 5,716,492 | A | * | 2/1998 | Li | 156/538 |
| 5,941,413 | A | * | 8/1999 | Roman | 221/73 |

* cited by examiner

*Primary Examiner*—Mark A. Osele
(74) *Attorney, Agent, or Firm*—Troxell Law Office PLLC

(57) ABSTRACT

A stripping apparatus for label separable paper includes a holder provided with a reel support rod at the rear side for fitting label tape reels thereon, a label stripping unit containing a guide plate, a separating rod and a guide rod provided at the front side and plural separating plates assembled between the guide plate and the reel support rod to separate the label tape reels and prevent them from moving sideward or slipping off. The guide plate curves upward above the separating rod, having its front edge positioned higher than the separating rod to let labels move slantingly upward along the guide plate and stripped. The reel support rod has its opposite ends respectively positioned on and restricted by the opposite inner sides of the holder so it can always be fixed stably on the holder whether the stripping apparatus is placed horizontally or hung on a wall.

9 Claims, 6 Drawing Sheets

STRIPPING APPARATUS FOR LABEL SEPARABLE PAPER

BACKGROUND OF THE INVENTION

1. Field of the Invention

This invention relates to a stripping apparatus for label separable paper, particularly to one able to prevent labels from adhering improperly and label tape reel or label tape from moving sideward or slipping off and also able to stably position a reel support rod and hang a stripping apparatus on a wall.

2. Description of the Prior Art

A conventional stripping apparatus for label separable paper includes a holder, a reel support frame and a label-stripping unit. The reel support frame is assembled at the rear sides of two side plates of the holder for label tape reels to be fitted thereon. The label stripping unit assembled at the front side of the two side plates of the holder consists of plural rods or plates for the label tapes on the label tape reels to move therethrough and stripped thereon.

However, the above-mentioned conventional stripping apparatus has the following defects.

1. The relative positions between the rods or between the plates of the label stripping unit are designed imperfectly; therefore when the label and the separable paper on the label tape are separated, the label is likely to adhere to a separating rod or pass through the gap between the separating rod and the plate, resulting in trouble in stripping.

2. The reel support frame for fitting the label tape reels is provided with no lateral position-limiting member; therefore when the label tape is drawn to be stripped, the label tape reel is likely to move sideward, and the label tape cannot be drawn smoothly and may slip off the label tape reel, causing much inconvenience in use.

3. The reel support frame is not firmly positioned and provided with no lateral position-limiting member; therefore the reel support frame is liable to slip sideward and drop when the stripping apparatus is moved about or the labels are drawn and stripped, possible to cause damage to the label tape.

4. The conventional stripping apparatus can only be placed horizontally but cannot be hung on a wall because its reel support frame is easy to slip and fall off.

SUMMARY OF THE INVENTION

A first objective of the invention is to offer a stripping apparatus for label separable paper, provided with a guide plate having its front edge slanting upward and positioned higher than a separating rod in front and having its front end bent downward to form a folded portion having an interior angle less than 90 degrees. Thus, the labels on a label tape can move forward along the front curved-up edge of the guide plate and be stripped, avoiding the labels adhering to the separating rod after they are stripped and preventing the labels from moving together with the separable paper and to get in the gap formed between the guide plate and separating rod, ensuring the labels to be stripped stably and effectively.

A second objective of the invention is to offer a stripping apparatus for label separable paper, provided with plural separating plates having their opposite ends respectively fixed with a reel support rod and the guide plate. The separating plates are positioned beside the opposite sides of a label tape reel so as to prevent the label tape reel from moving laterally and the label tape on the label tape reel from slipping sideward and dropping, ensuring the label tape to be drawn and stripped stably and smoothly.

A third objective of the invention is to offer a stripping apparatus for label separable paper, in which the reel support rod has its opposite ends respectively provided with a support shaft to be positioned in the position groove of the opposite side walls of a bottom plate to prohibit the reel support rod to move laterally and in which the bottom plate of a holder is bored with plural hang holes so that the stripping apparatus can be hung on a wall. Thus, when the stripping apparatus is placed horizontally or hung on a wall, the reel support rod can always be fixed in position never to slip sideward or fall off.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
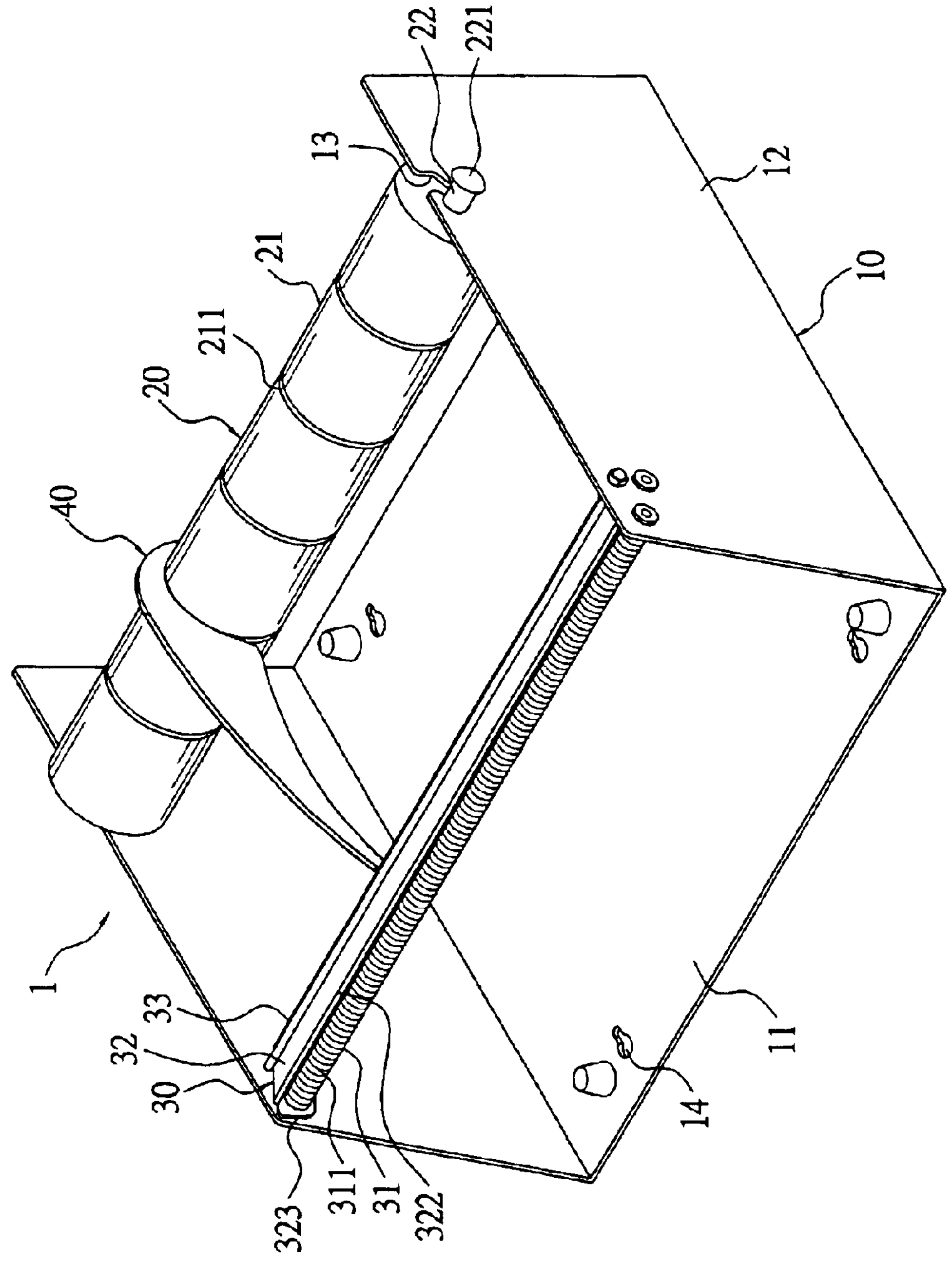
FIG. 1 is a perspective view of a stripping apparatus for label separable paper placed horizontally in the present invention.
Figure 2:
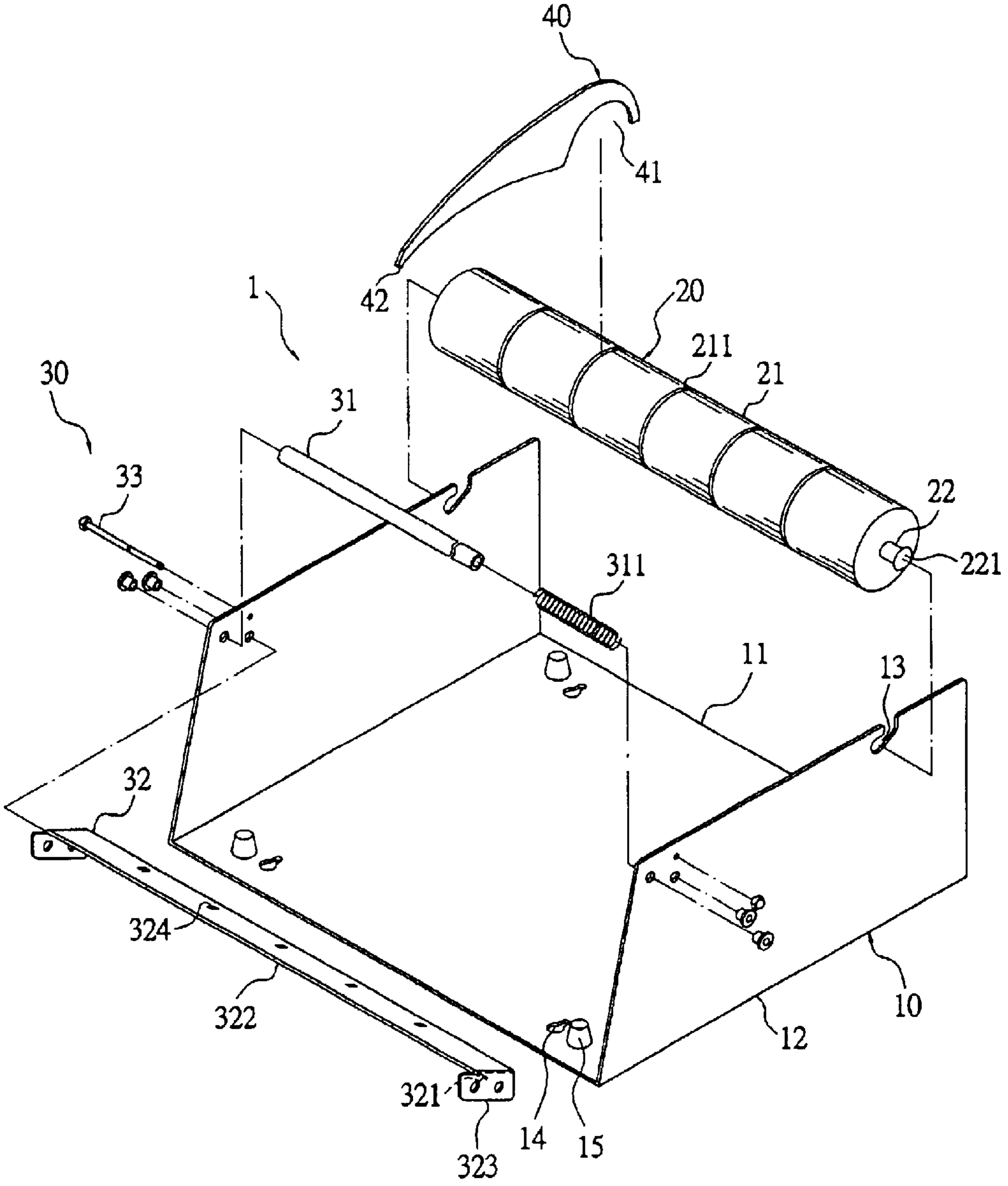
FIG. 2 is an exploded perspective view of the stripping apparatus for label separable paper in the present invention.
Figure 3:
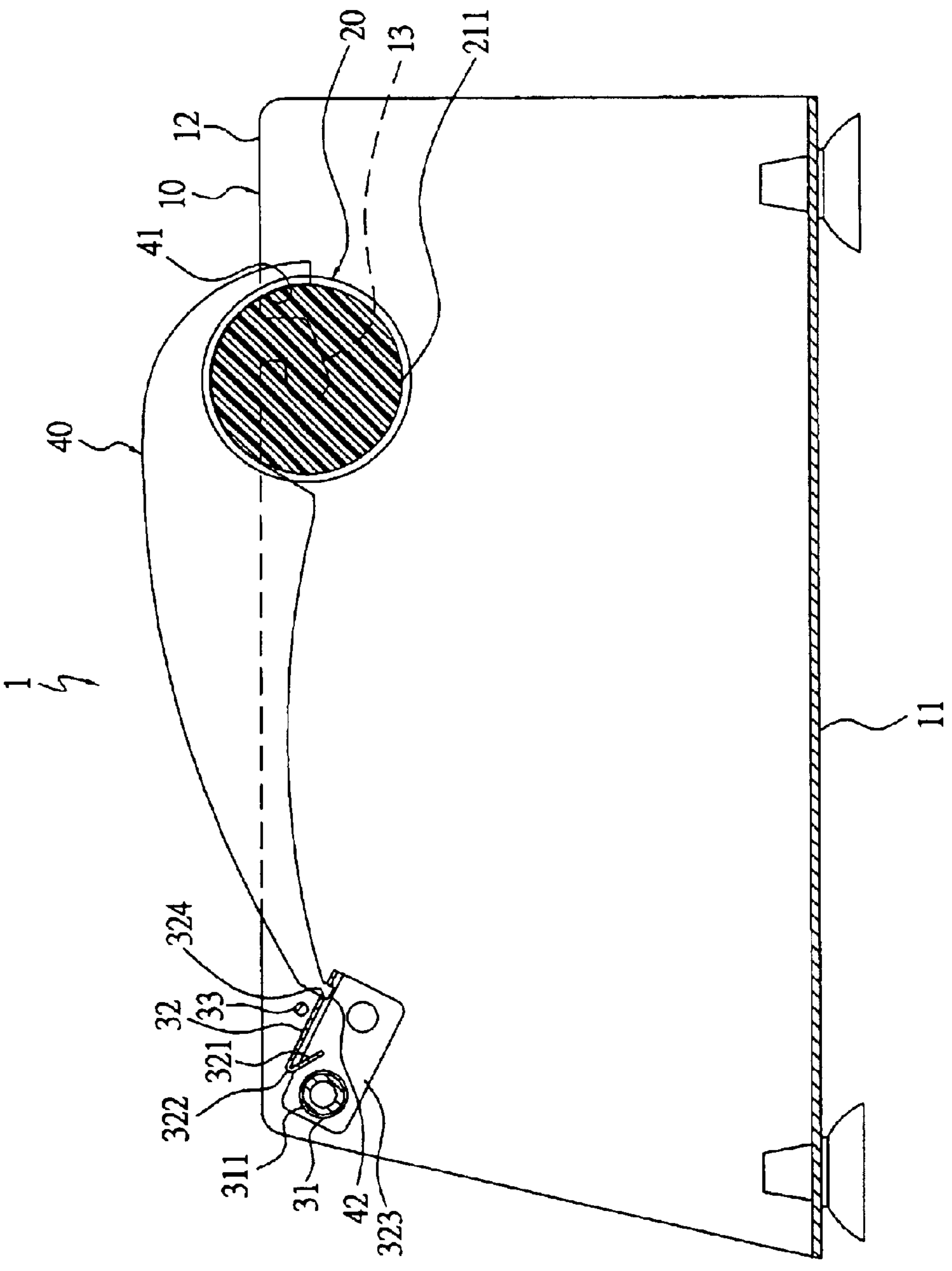
FIG. 3 is a side cross-sectional view of the stripping apparatus for label separable paper in the present invention.

A preferred embodiment of a stripping apparatus for label separable paper in the present invention, as shown in FIGS. 1, 2 and 3, includes a holder 10, a reel support rod 20, a label stripping unit 30 and at least one separating plate 40 as main components combined together.

The holder 10 consists of a bottom plate 11 having its opposite sides bent to extend vertically upward and form parallel side walls 12 respectively having a L-shaped position groove 13 bored downward and then forward at a preset position of the upper edge near its rear side. The bottom plate 11 of the holder 10 is provided with plural hang holes 14 at preset locations and each hang hole 14 including a large hole and a small hole communicating with each other for receiving various kinds of bolts 15 therein to hang the stripping apparatus on a wall.

The reel support rod 20 is a rod body 21 with a comparatively large diameter. The rod body 21 has its outer circumference bored with a plurality of annular groove 211 at preset intervals and its opposite ends respectively provided with a support shaft 22 extending outward and having a comparatively small diameter. Each support shaft 22 has its outer end secured with a position rim 221 having a diameter larger than that of the support shaft 22. Thus, the reel support rod 20 can be stably positioned by its support shafts 22 fitted in the L-shaped position grooves 13 of the two side walls 12 of the holder 10 and prohibited to move laterally by the two position rims 221, which are respectively positioned on the outer sides of the two position groove 13 of the two side walls 12. Plural label tape reels 50 having label tapes 51 wound thereon are fitted around the reel support rod 20.

The label-stripping unit 30 consists of a separating rod 31, a guide plate 32 and a guide rod 33. The separating rod 31 having a coil 311 fitted thereon has its opposite ends respectively fixed at a preset location on the front inner side of the side wall 12 of the bottom plate 11 for the labels 511 of the label tape 51 to adhere thereon temporarily after the labels 511 are stripped. The guide plate 32 is an elongate plate, having its front end bent downward to form a folded portion 321 having an in interior angle less than 90 degrees. The guide plate 32 has an arc-shaped front edge 322 curving upward and positioned above the separating rod 31. The guide plate 32 has its opposite ends bent inward to form two pivotal members 323 to be slantingly riveted on the opposite inner sides of the two side walls 12 behind the separating rod 31, and the guide plate 32 has its front edge 322 positioned higher than the separating rod 31, as shown in FIG. 3. Thus, when the label tape 51 moves through the guide plate 32, the labels 51 on the label tape 51 will begin to slant upward and be stripped at the arc-shaped front edge 322 of the guide plate 32, able to prevent the labels 51 from moving together with the separable paper 512 to get in the gap between the separating rod 31 and the guide plate 32. The guide plate 32 further has its upper surface bored with a plurality of insert holes 324 at preset intervals to match with the annular grooves 211 of the support rod body 21. The guide rod 33 positioned behind the guide plate 32 is assembled between the opposite inner sides of the two side walls 12 of the bottom plate 11, having a proper gap formed between the guide rod 33 and a preset portion of the topside of the guide plate 32 for the label tape 51 to pass therethrough.

The three separating plates 40 respectively have its rear lower end formed with an arc-shaped engage groove 41 to be engaged with the annular groove 211 of the support rod body 21 of the reel support rod 20 and its front end formed with a downward insert portion 42 to be inserted in the insert hole 324 of the guide plate 32. Thus, the separating plates 40 can be positioned beside the opposite sides of the label tape reel 50 fitted on the reel support rod 20 so as to prevent the label tape reel 50 from moving laterally and the label tape 51 from slipping sideward and dropping.

Figure 4:
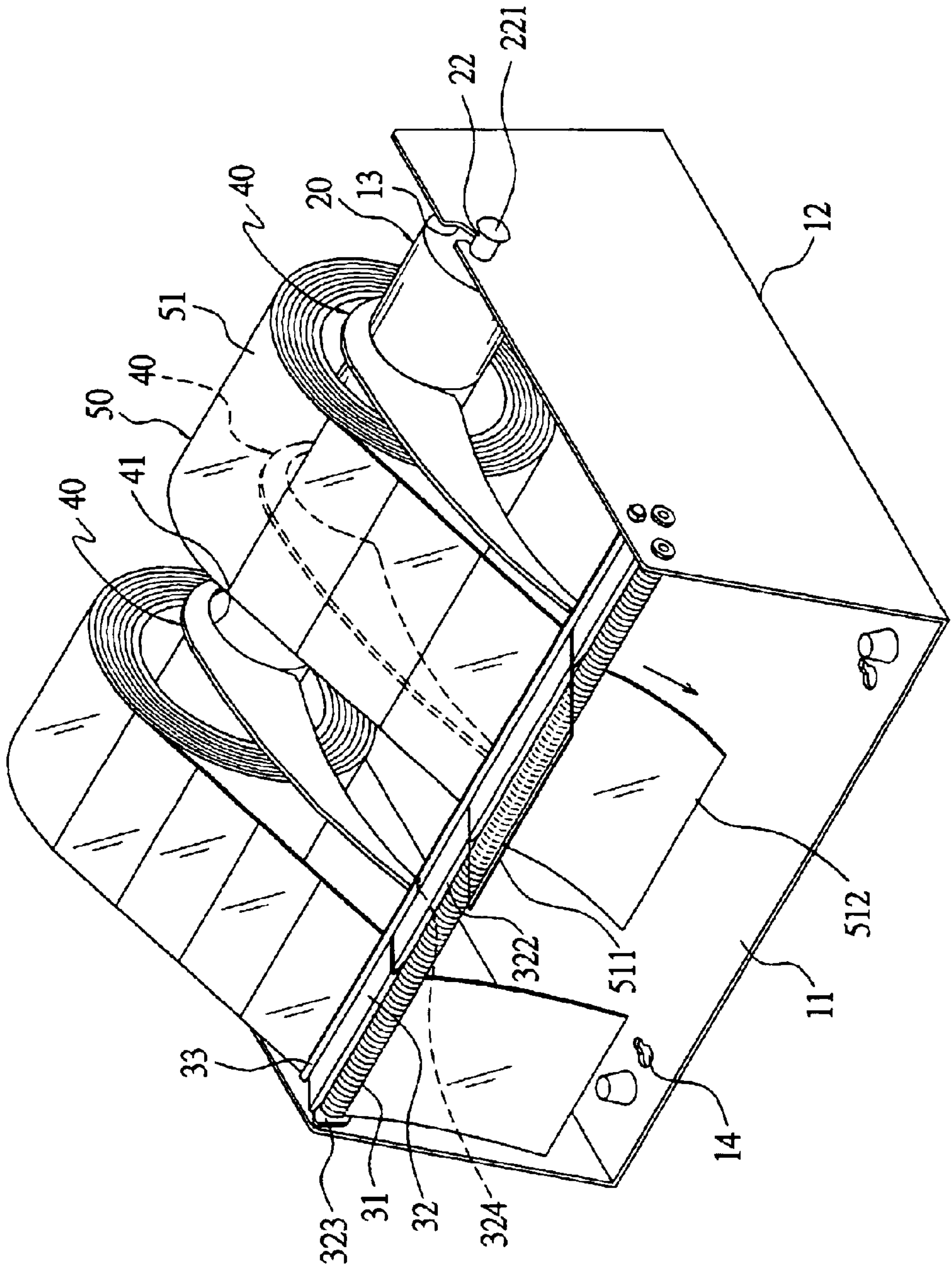
FIG. 4 is a perspective view of the stripping apparatus for label separable paper in the present invention, showing label tape reels assembled thereon.
Figure 5:
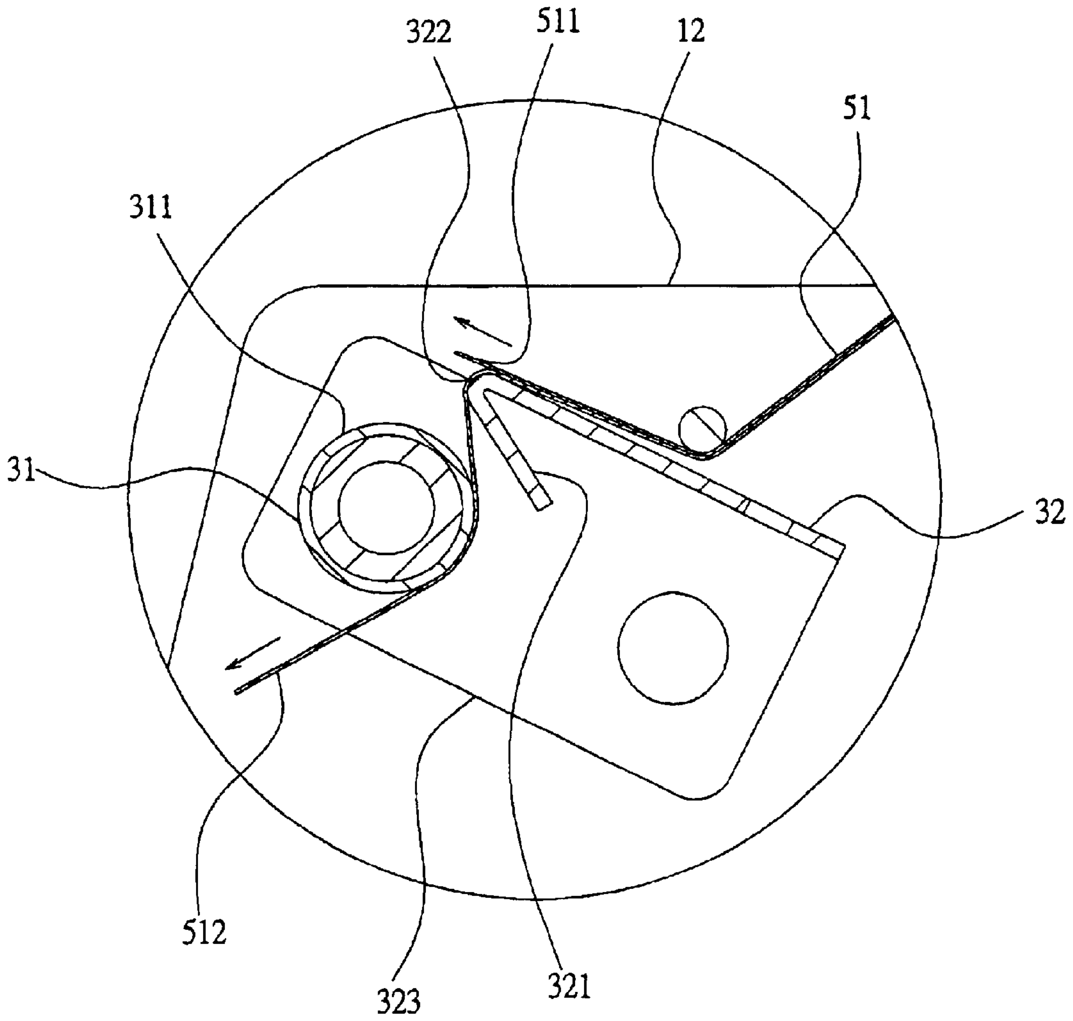
FIG. 5 is a side cross-sectional view of the stripping apparatus for label separable paper in the present invention, showing label tape reels assembled thereon.

In assembling, as shown in FIGS. 4 and 5, firstly, remove the reel support rod 20 from the holder 10 and orderly fit the label tape reels 50 on the reel support rod 20 and then have the opposite support shafts 22 of the reel support rod 20 respectively engaged in the two position grooves 13 of the two side walls 12 of the holder 10, letting the position rims 221 on the outer end of the support shaft 22 respectively positioned on the outer side of the position groove 13 to prevent the reel support rod 20 from slipping laterally.

Next, the label tape reels 50 on the reel support rod 20 are moved to proper positions and the separating plates 40 have their opposite ends respectively positioned in the annular grooves 211 of the reel support rod 20 and the insert holes 324 of the guide plate 32 to prevent the label tape reels 50 from moving laterally and the label tapes 51 from slipping sideward and becoming loose to ensure the label tapes 51 to be drawn outward smoothly.

Lastly, the label tapes 51 wound around the label tape reels 50 are drawn outward to pass through the gap between the guide rod 33 and the guide plate 32 and then have a small part of the upper label 511 and the lower separable paper 512 of the label tape 51 stripped in advance. Subsequently, the separable paper 512 is downward inserted through the gap between the guide plate 32 and the separating rod 31 and has a reserved part extending outward.

To strip the labels 511 for use, the above-mentioned reserved part of the separable paper 512 is pulled outward and downward and the labels 511 on the label tape 51 will move forward along the upward slanting guide plate 32 thus letting the label 511 and the separable paper 512 of the label tape 51 separated at the front edge 322 of the guide plate 32. After stripped, the labels 511 will not adhere to the separating rod 31 because the labels 511 move slantingly upward and the front edge 322 of the guide plate 32 is positioned higher than the separating rod 31, preventing the labels 511 from moving together with the separable paper 512 and getting through the gap between the guide plate 32 and the separating rod 31. So the label tape 51 is ensured to be stripped smoothly.

Figure 6:
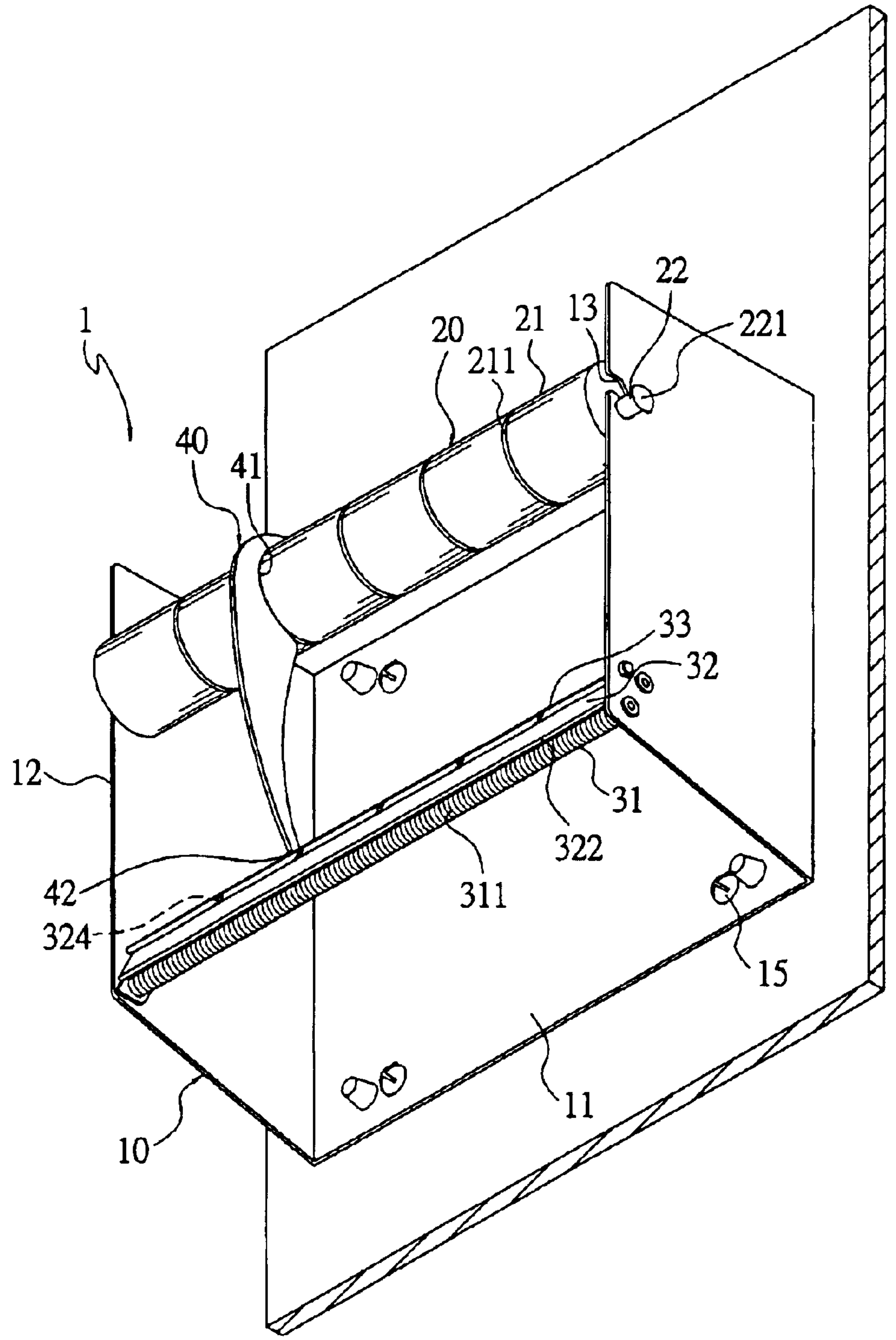
FIG. 6 is a perspective view of the stripping apparatus hung on a wall in the present invention.

A shown in FIG. 6, apart from being placed horizontally, the stripping apparatus 1 can also be hung on a wall. The stripping apparatus 1 for label separable paper in the present invention has the bottom plate 11 of its holder 10 bored with plural hang holes 14 for receiving various kinds of bolts therein, and its reel support rod 20 having the opposite ends stably positioned on the two side walls 12 of the holder 10. Therefore, when the stripping apparatus 1 is hung on a wall, the reel support rod 20 will never slip sideward and fall off, with the label tape reel 50 stably supported, enhancing applicability of positioning the stripping apparatus 1 and letting the label tape 51 drawn for use conveniently.

While the preferred embodiment of the invention has been described above, it will be recognized and understood that various modifications may be made therein and the appended claims are intended to cover all such modifications that may fall within the spirit and scope of the invention.

What is claimed is:

1. A stripping apparatus for label separable paper comprising:

A holder formed with a bottom base, said bottom base having its opposite sides respectively extending vertically up to form parallel side walls, said parallel side walls of said holder respectively bored with a position groove at a preset position of the upper edge near the rear end, said bottom plate provided with plural hang holes at preset locations;

A reel support rod being a rod body with a comparatively large diameter, said rod body having its opposite ends respectively provided with a protruding-out support shaft with a comparatively small diameter, each said support shaft having its outer end secured with a position rim, said reel support rod firmly positioned between said two side walls of said holder by fitting said two support shafts in said two position grooves of said two side walls, said two position rims of said support shaft respectively fixed on the outer side of, said position groove, said two position rims restricting firmly said reel support rod on said holder, said reel support rod fitted thereon with label tape reels;

A label stripping unit comprising a separating rod, a guide plate and a guide rod, said separating rod having its opposite ends respectively secured at preset locations on the front inner sides of said two side walls of said bottom plate, said separating rod fitted thereon with a coil, said coil preventing labels on separable paper of a label tape from adhering to said separating rod after said labels are stripped, said guide plate being an elongate plate and having its front lengthwise side bent downward to form a folded portion in an interior angle less than 90 degrees, said guide plate formed having its bending part formed with an arc-shaped front edge, said front edge curved upward and positioned above said separating rod, said guide plate slantingly fixed between the opposite inner sides of said two side walls behind said separating rod, said guide plate having said front edge positioned higher than said separating rod, said labels stripped at said curved-up front edge of said guide plate when said label tape passes through said guide plate, preventing said label from moving together with said separable paper and getting through the gap between said separating rod and said guide plate, said guide rod fixed between the opposite inner sides of said two side walls behind said guide plate, a proper gap formed between said guide rod and a preset portion of the topside of said guide plate, said label tape on said label tape reel passing through said gap between said guide and said guide plate; and At least one separating plate of a preset shape having the opposite ends respectively engaged with said reel support rod and said guide plate, said separating plates positioned beside the opposite sides of said label tape reel on said reel support rod to hamper said label tape reel from slipping sideward.

2. The stripping apparatus for label separable paper as claimed in claim 1, wherein each said hang hole of said bottom plate comprises a large hole and a small hole communicating with each other for various kinds of bolts to be inserted therein so as to hang said stripping apparatus on a wall.

3. The stripping apparatus for label separable paper as claimed in claim 1, wherein said position groove of said holder is L-shaped and bored downward and then forward, able to stably fix said reel support rod in said position grooves when said holder has its front end positioned downward.

4. The stripping apparatus for label separable paper as claimed in claim 1, wherein said two position rims on the opposite ends of said reel support rod are respectively fixed on the ends of said two support shafts.

5. The stripping apparatus for label separable paper as claimed in claim 1, wherein said guide plate has its opposite ends respectively bent inward to form pivotal members, which are respectively secured on the opposite inner sides of said two side walls of said bottom plate.

6. The stripping apparatus for label separable paper as claimed in claim 1, wherein the outer circumference of said support rod body of said reel support rod and the topside of said guide plate are respectively provided with plural position recesses at preset intervals, said position recesses of said support rod body and said guide plate aligned to each other for engaging the opposite ends of said separating plates.

7. The stripping apparatus for label separable paper as claimed in claim 6, wherein said position recesses are annular grooves or insert holes.

8. The stripping apparatus for label separable paper as claimed in claim 7, wherein said separating plate has its rear lower end formed with an arc-shaped engaged groove to be engaged with one of said annular grooves of said support rod body and its front lower end formed with an insert portion to be inserted in one of said insert holes of said guide plate.

9. The stripping apparatus for label separable paper as claimed in claim 1, wherein said separating plate has its rear lower end formed with an arc-shaped engage groove to be engaged with one of said annular grooves of said support rod body and its front lower end formed with an insert portion to be inserted in one of said insert holes of said guide plate.

* * * * *